United States Patent
Zhao

(10) Patent No.: US 9,547,193 B2
(45) Date of Patent: Jan. 17, 2017

(54) TRANSFLECTIVE TYPE LIQUID CRYSTAL DISPLAY PANEL AND DISPLAY USING THE SAME

(71) Applicant: BOE TECHNOLOGY GROUP CO., LTD., Beijing (CN)

(72) Inventor: Weili Zhao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 258 days.

(21) Appl. No.: 14/346,524

(22) PCT Filed: Jun. 13, 2013

(86) PCT No.: PCT/CN2013/077182
§ 371 (c)(1),
(2) Date: Mar. 21, 2014

(87) PCT Pub. No.: WO2014/153850
PCT Pub. Date: Oct. 2, 2014

(65) Prior Publication Data
US 2015/0212369 A1    Jul. 30, 2015

(30) Foreign Application Priority Data
Mar. 28, 2013   (CN) .......................... 2013 1 0104955

(51) Int. Cl.
G02F 1/1335    (2006.01)
G02F 1/1337    (2006.01)
G02F 1/1343    (2006.01)

(52) U.S. Cl.
CPC ... *G02F 1/133555* (2013.01); *G02F 1/133514* (2013.01); *G02F 1/133528* (2013.01);
(Continued)

(58) Field of Classification Search
CPC .................. G02F 1/133555; G02F 1/133707; G02F 1/133514; G02F 1/133528; G02F 2001/133531; G02F 2001/134381
(Continued)

(56) References Cited

U.S. PATENT DOCUMENTS 7,525,614 B2 *   4/2009   Jeong ................ G02F 1/133555
                                                            349/113
2003/0038908 A1 *  2/2003  Ikeno ................ G02F 1/136227
                                                            349/113
(Continued)

FOREIGN PATENT DOCUMENTS

CN    101231397 A    7/2008
CN    102645796 A    8/2012
(Continued)

OTHER PUBLICATIONS

International Prelimlnary Report on Patentability issued Sep. 29, 2015; PCT/CN2013/077182.
(Continued)

*Primary Examiner* — Hoan C Nguyen
(74) *Attorney, Agent, or Firm* — Ladas & Parry LLP

(57) ABSTRACT

A transflective type liquid crystal display panel and a display using it are provided in order to solve the problem that there exists much difficulty in the making process of the upper substrate in the transflective type liquid crystal display panel. A second common electrode layer (201) is provided between an liquid crystal layer (24) and a first substrate (22) in a transmissive region (T) and a reflective region (R) in the display panel; the initial orientation of the liquid crystal molecules in the reflective region (R) forms an angle of 45 degrees with the transmissive axis of a lower polarizer (29); the initial orientation of the liquid crystal molecules in the transmissive region (T) is perpendicular to the first substrate (22) or a second substrate (202); a plurality of common
(Continued)

electrodes (27) and a plurality of pixel electrodes (28) are provided on the surface of the second insulating layer (26) in the transmissive region (T) near the liquid crystal layer (24), and the common electrodes (27) and the pixel electrodes (28) are arranged with an interval therebetween.

20 Claims, 2 Drawing Sheets

(52) U.S. Cl.
CPC .................. *G02F 1/133707* (2013.01); *G02F 2001/133531* (2013.01); *G02F 2001/134381* (2013.01)

(58) Field of Classification Search
USPC .......................................................... 349/114
See application file for complete search history.

(56) References Cited

U.S. PATENT DOCUMENTS

| | | | | |
|---|---|---|---|---|
| 2007/0146591 A1* | 6/2007 | Kimura | ............. | G02F 1/133555 349/114 |
| 2008/0068523 A1* | 3/2008 | Mitsui | ............... | G02F 1/133555 349/37 |
| 2009/0262287 A1* | 10/2009 | Nishida | ............. | G02F 1/133555 349/114 |
| 2010/0128208 A1* | 5/2010 | Kurasawa | ............. | G02F 1/1323 349/106 |
| 2011/0001690 A1* | 1/2011 | Mori | .................... | G09G 3/3655 345/87 |

FOREIGN PATENT DOCUMENTS

| | | |
|---|---|---|
| CN | 202748579 U | 2/2013 |
| CN | 102955304 A | 3/2013 |
| JP | 2007133084 A * | 5/2007 |

OTHER PUBLICATIONS

International Search Report for International Application No. PCT/CN2013/077182, 13pgs.
The State Intellectual Property Office of the People's Republic of China ("SIPO") (Chinese language) first office action issued on Jan. 16, 2015 by SIPO in Chinese Patent Application 201310104955.7. Seven (7) pages.
English Translation of the State Intellectual Property Office of the People's Republic of China ("SIPO") (Chinese language) first office action issued on Jan. 16, 2015 by SIPO in Chinese Patent Application 201310104955.7. Six (6) pages.
English abstract of CN102955304A; One (1) pages.
English abstract of CN101231397A: One (1) page.

* cited by examiner

TRANSFLECTIVE TYPE LIQUID CRYSTAL DISPLAY PANEL AND DISPLAY USING THE SAME

CROSS REFERENCE TO RELATED APPLICATIONS

This application is based on International Application No. PCT/CN2013/077182 filed on Jun. 13, 2013, which claims priority to Chinese National Application No. 201310104955.7 filed on Mar. 28, 2013. The entire contents of each and every foregoing application are incorporated herein by reference.

TECHNICAL FIELD

Embodiments of the present invention relate to a transflective type liquid crystal display panel and a display using the same.

BACKGROUND

A transflective type liquid crystal display panel has both a transmissive mode and a reflective mode. In a relatively dark environment, the transmissive mode is mainly used, that is, the backlight of the transflective type liquid crystal display transmits the liquid crystal display panel, to display images; and in a relatively bright environment, for example, in the sunshine, the reflective mode is mainly used, that is, mirrors within the liquid crystal display panel are used to reflect external light, which is used as a light source to display images. Therefore, the transflective type liquid crystal display is applicable to environments having different light intensities, and especially has an excellent outdoor visibility. In addition, the backlight does not require a high brightness and has an advantage of low power consumption, thus it is widely used in products such as vehicle-mounted display, high-end mobile phone, digital camera, handheld computer, and aviation display meters.

The prior transflective type liquid crystal display panel, as illustrated in FIG. 1, sequentially comprises, from the top to the bottom, an upper polarizer 11, a first substrate 12, a first insulating layer 13, a liquid crystal layer 14, a pixel electrode layer 15, a second insulating layer 16, a second substrate 17 and a lower polarizer 18. The upper polarizer 11, the first substrate 12 and the first insulating layer 13 constitute an upper substrate S, and the pixel electrode layer 15, the second insulating layer 16, the second substrate 17 and the lower polarizer 18 constitute a lower substrate X. The transmissive axis of the upper polarizer 11 is perpendicular to the transmissive axis of the lower polarizer 18.

The liquid crystal display panel is divided into a plurality of sub-pixels, wherein each sub-pixel is divided into a transmissive region T and a reflective region R, and in the transmissive region T: a first common electrode layer 19 is disposed between the second insulating layer 16 and the second substrate 17 in the lower substrate X; in the reflective region R: a second common electrode layer 101 is disposed on the first insulating layer 13 in the upper substrate S; and a reflective electrode layer 102 is provided on the second insulating layer 16 in the lower substrate X. The projections of the pixel electrodes on the pixel electrode layer 15 in the transmissive region T alternate with and are parallel to the projections of the common electrodes on the first common electrode layer 19 on the second substrate 17, and such projections have the same interval therebetween.

The initial orientation of the liquid crystal molecules in the transmissive region T is parallel to the transmissive axis of the lower polarizer 18, and the initial orientation of the liquid crystal molecules in the reflective region R forms an angle of 45 degrees with the transmissive axis of the lower polarizer 18.

During manufacturing the above transflective type display panel, the part corresponding to the transmissive region T on the first insulating layer 13 of the upper substrate S is not disposed with the second common electrode layer 101, while the part corresponding to the reflective region T on the first insulating layer 13 is disposed with the second common electrode layer 101, which results in that the transmissive region T and the reflective region R of the upper substrate S have different structures, such that an additional mask plate is needed during manufacturing the upper substrate S to make the above structure. Therefore, there exists relatively much difficulty in the making process during manufacturing the upper substrate S.

SUMMARY

Embodiments of the present invention provide a transflective type liquid crystal display panel and a display using the same, and solve the problem in the prior art that there exists much difficulty in the manufacturing process of the upper substrate in the transflective type display panel.

An embodiment of the present invention provides a transflective type liquid crystal display panel, comprising sequentially from top to bottom: an upper polarizer, a first substrate, a liquid crystal layer, an electrode layer, a second substrate and a lower polarizer, wherein, the upper polarizer has a transmissive axis perpendicular to that of the lower polarizer, each sub-pixel of the liquid crystal display panel is divided into a transmissive region and a reflective region, the electrode layers of the transmissive region and the reflective region have different structures, electrode layer of the transmissive region comprises a plurality of common electrodes and a plurality of pixel electrodes, and the electrode layer in the reflective region comprises a reflective electrode, in the transmissive region and the reflective regions, a second common electrode is provided between the liquid crystal layer and the first substrate, liquid crystal molecules in the transmissive region have an initial orientation perpendicular to the first substrate or the second substrate, liquid crystal molecules in the reflective region have an initial orientation which forms an angle of 45 degrees with the transmissive axis of the lower polarizer, and the plurality of common electrodes and the plurality of pixel electrodes in the transmissive region are arranged alternately with an interval therebetween.

In one example, each of the common electrodes and each of the pixel electrodes have identical shapes, i.e., a continuous sawtooth shape constituted by a plurality of sawtooth edges, and two adjacent sawtooth edges form a sawtooth angle; the angle bisectors of the sawtooth angle on each of the common electrodes is parallel to or collinear with that of the sawtooth angle on each of the pixel electrodes; and the sawtooth angles of the common electrodes and the pixel electrodes with collinear angle bisectors have the same opening direction.

In one example, the sawtooth angle is 90 degrees.

In one example, the liquid crystal panel further comprises a first insulating layer, located between the first substrate and the liquid crystal layer; and a second insulating layer, located between the electrode layer and the second substrate.

In one example, in the transmissive region, the plurality of common electrodes and the plurality of pixel electrodes are distributed alternately with the same interval therebetween.

In one example, the second common electrode and the reflective electrodes in the reflective electrode layer are plane electrodes.

In one example, the reflective electrodes are metal electrodes.

In one example, the liquid crystal display panel further comprises a color filter layer, and the color filter layer is located between the first substrate and the second common electrode.

In one example, the color filter layer covers the transmissive region and the reflective region.

Another embodiment of the present invention further provides a display, comprising the transflective type liquid crystal display panel according to any embodiment of the present invention.

In the transflective type liquid crystal display panel and the display using it provided by the embodiments of the present invention, during manufacturing the upper substrate, as the second common electrode layer is provided between the first insulating layer and the first substrate of the transmissive region and the reflective region, that is, both the transmissive region and the reflective region is covered with the second common electrode layer, such that the transmissive region and the reflective region in the upper substrate have the same structure, thus, no additional mask plate is required during manufacturing the second common electrode of the upper substrate, thus the difficulty in the manufacturing process is lowered during making the upper substrate.

BRIEF DESCRIPTION OF THE DRAWINGS

In order to more clearly illustrate the technical solutions of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention more apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Figure 1:
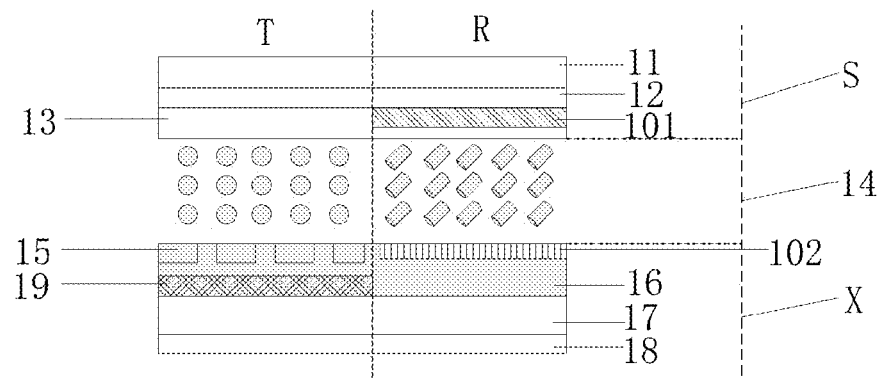
FIG. 1 is a structural schematic diagram of the transflective liquid crystal display panel in the prior art.
Figure 2:
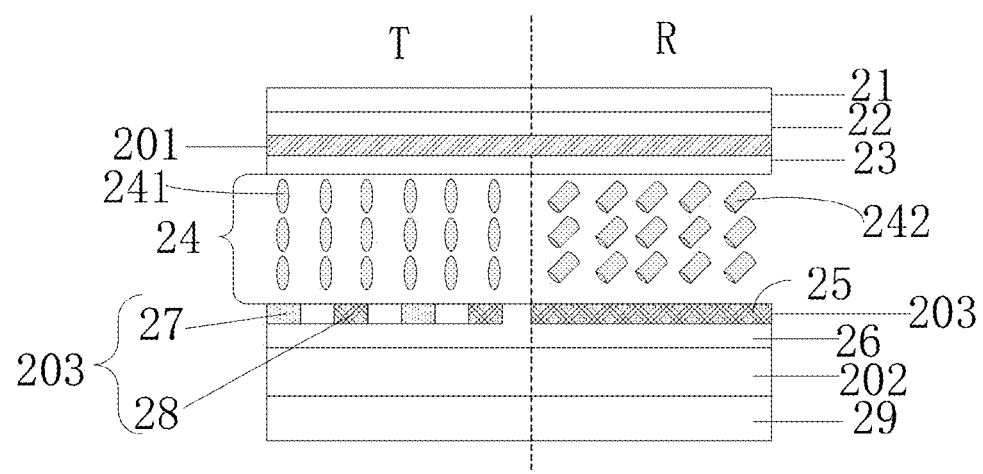
FIG. 2 is a schematic diagram of the cross-section of the structure of the transflective type liquid crystal display panel provided by an embodiment of the present invention.
Figure 3:
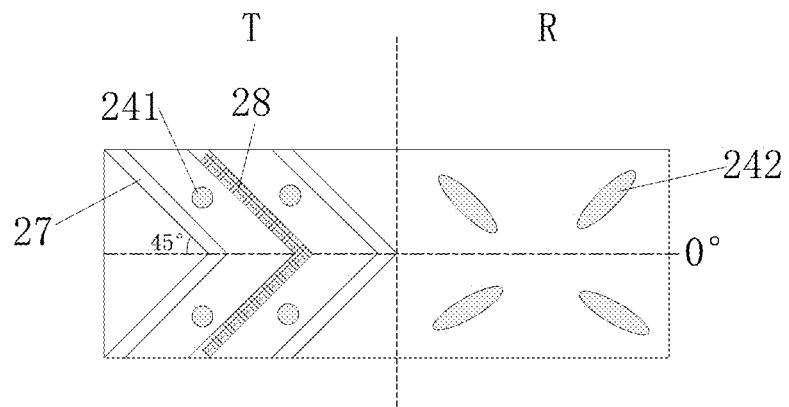
FIG. 3 is a planar schematic diagram of the transmissive region and the reflective region when the liquid crystal display panel is not applied power as illustrated in FIG. 2.

The embodiments of the present invention provide a transflective type liquid crystal display panel, referring to FIGS. 2 and 3. From FIG. 2, the display panel, from the top to bottom, sequentially comprises an upper polarizer 21, a first substrate 22, a first insulating layer 23, a liquid crystal layer 24, an electrode layer 203, a second insulating layer 26, a second substrate 202 and a lower polarizer 29. The transmissive axis of the upper polarizer 21 is perpendicular to the transmissive axis of the lower polarizer 29. According to the different structures of the electrode layer 203, each of the sub-pixels of the liquid crystal display panel is divided into the transmissive region T and the reflective region R, the electrode layer 203 of the transmissive region T comprises a common electrode 27 and a pixel electrode 28, and the electrode layer 203 of the reflective region R comprises a reflective electrode 25; and a second common electrode layer 201 is provided between the liquid crystal layer 24 and the first substrate 22 in the transmissive region T and the reflective region R. The initial orientation of the liquid crystal molecules in the transmissive region T is perpendicular to the first substrate 22 or the second substrate 202, and the initial orientation of the liquid crystal molecules in the reflective region R forms an angle of 45 degrees with the transmissive axis of the lower polarizer 29.

From FIG. 3, the surface of the second insulating layer 26 in the transmissive region T near the liquid crystal layer 24 is provided with a plurality of common electrodes 27 and a plurality of pixel electrodes 28, and the common electrodes 27 and the pixel electrodes 28 are arranged alternately with an interval therebetween.

Figure 4:
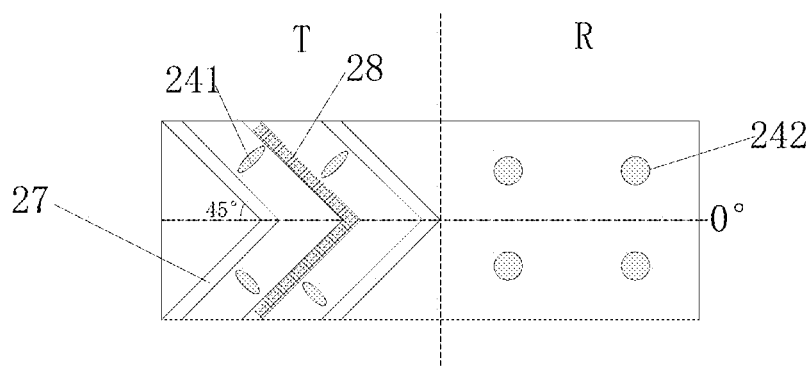
FIG. 4 is a planar schematic diagram of the transmissive region and the reflective region when the liquid crystal display panel is applied power as illustrated in FIG. 3.

The following is a detailed description of the operating principle of the above transflective type liquid crystal display panel in combination with FIGS. 2 and 3. Upon the above transflective type liquid crystal display panel is not applied power, as illustrated in FIG. 4, liquid crystal molecules 241 in the transmissive region T are arranged perpendicular to the first substrate 22, the initial orientation of the liquid crystal molecules 241 in the transmissive region T is perpendicular to the transmissive axis of the lower polarizer 29, the liquid crystal molecules 241 do not have phase delay to light, thus do not change the polarization direction of the light. The light transmits the upper polarizer 21 and is emitted to the liquid crystal layer 24, the polarizing direction of the light do not change, and as the transmissive axis of the upper polarizer 21 is perpendicular to the transmissive axis of the lower polarizer 29, the light is absorbed by the lower polarizer 29, and the above liquid crystal panel presents a dark state.

In the reflective region R, the initial orientation of the liquid crystal molecules 242 forms an angle of 45 degrees with the transmissive axis of the lower polarizer 29, thus the phase delay of the liquid crystal molecules 242 to the light is $\lambda/4$, after the light goes through the liquid crystal molecules 242, the linear polarized light is changed into a circular polarized light, and the light is changed into another circular polarized light (left spiral is changed into right spiral, and the right spiral is changed into the left spiral) after being reflected by the reflective electrode 25, while after the light goes through the liquid crystal molecules 242 of the reflective region R for the second time, the circular polarized light is changed back to the linear polarized light, but the phase of the light is changed by 90 degrees, i.e., the light forms an angle of 90 degrees with the initial linear polarized light, thus the light is absorbed by the upper polarizer 21, and the above liquid crystal panel presents a dark state.

In the transflective liquid crystal display panel provided by the embodiment of the present invention, during manufacturing the upper substrate, as the second common electrode layer is provided between the liquid crystal layer and the first substrate in the transmissive region and the reflective region, that is, both the transmissive region and the reflective region is covered with the second common electrode layer, such that the transmissive region and the reflective region in the upper substrate have the same structure, thus, no additional mask plate is needed during manufacturing the second common electrode layer of the upper substrate, and thus the difficulty in the manufacturing process is lowered during making the upper substrate.

In the transflective type liquid crystal display panel provided by the above embodiment, each of common electrodes 27 and each of the pixel electrodes 28 have identical shapes, i.e., a continuous sawtooth shape constituted by a plurality of sawtooth edges, and two adjacent sawtooth edges form a sawtooth angle; the angle bisectors of the sawtooth angle on each of the common electrodes 27 and the sawtooth angle on each of the pixel electrodes 28 are parallel to or collinear with each other; and the sawtooth angles of the common electrodes 27 and the pixel electrodes 28 which angle bisectors are collinear have consistent opening directions, and the sawtooth angle is 90 degrees; and the adjacent common electrodes 27 and the pixel electrodes 28 have opposite polarities.

FIGS. 3 and 4 only illustrate the shape that the common electrodes 27 and the pixel electrodes 28 have one sawtooth. However, the common electrodes 27 and the pixel electrodes 28 in the embodiment of the present invention can also have the shape with a plurality of continuous sawteeth.

When the above transflective type liquid crystal display panel is applied power, referring to FIGS. 2 and 4, as each of common electrodes 27 and each of the pixel electrodes 28 have identical shapes, i.e., a continuous sawtooth shape constituted by a plurality of sawtooth edges, and two adjacent sawtooth edges form a sawtooth angle; the angle bisectors of the saw angle on each of the common electrodes 27 and the saw angle on each of the pixel electrodes 28 are parallel to or collinear with each other; and the sawtooth angles of the common electrodes 27 and the pixel electrodes 28 which angle bisectors are collinear have consistent opening directions, and the sawtooth angle is 90 degrees; and the adjacent common electrodes 27 and the pixel electrodes 28 have opposite polarities, under a specific voltage, the phase delay of the liquid crystal molecules 241 in the transmissive region T to the light is $\lambda/2$. The light is emitted into one side of the lower polarizer 29, after the light goes through the lower polarizer 29, only the polarized light that is in consistency with the transmissive axis of the lower polarizer 29 transmits the lower polarizer 29, the light transmitting the polarizer 29 reaches the liquid crystal layer 24, the phase of the light after going through the liquid crystal molecules 241 changes by 90 degrees, while the transmissive axis of the upper polarizer 21 is perpendicular to the transmissive axis of the lower polarizer 29, thus the light can transmit the upper polarizer 21, and the above liquid crystal panel presents a bright state.

In the reflective region R, the liquid crystal molecules 242 in the liquid crystal layer 24 in the region are arranged in the electrical field direction under the effect of a vertical electrical field, the phase delay of the liquid crystal molecules 242 to the light is 0, the environmental light is emitted from the upper polarizer 21, after the light goes through the upper polarizer 21, only the polarized light which is consistent with the transmissive axis of the upper polarizer 21 can transmit, the polarized light, after going through the liquid crystal layer 24 arranged vertically, does not change the polarization state, and the polarizing state of the light still does not change after being reflected by the reflective electrode 25 of the reflective region R again; and then, the light goes through the liquid crystal layer 24 for the second time, and finally transmits the upper polarizer 21, and the above liquid crystal display panel presents a bright state.

In the transflective type liquid crystal panel provided by the above embodiments, it further comprises a first insulating layer 23 located between the first substrate 21 and the liquid crystal layer 24 such that the second common electrode layer 201 is insulated from the outside.

In the transflective type liquid crystal display panel provided by the above embodiments, the horizontal distances between the common electrodes 27 and the adjacent pixel electrodes 28 in the transmissive region T can be equivalent to the each other. That is, the plurality of common electrodes and the plurality of common electrodes in the transmissive region are distributed alternately with an equivalent interval therebetween. Thus, the electrical field in the transmissive region T has equivalent intensity everywhere, thus the state of the liquid crystal molecules 241 in the region is more stable.

In the transflective type liquid crystal panel provided by the above embodiments, the second common electrode 201 and the reflective electrodes 25 in the reflective electrode layer 25 can be plane electrodes. The plane electrode has the advantages of low cost and stable performance.

In the transflective type liquid crystal panel provided by the above embodiments, the reflective electrode 25 can be a metal electrode in the plane electrode, and the reflectivity of the metal electrode is relatively strong, and favors the reflection of the incident light.

In the embodiments of the present invention, as the initial orientations of the liquid crystal molecules in the reflective region and the transmissive region are different from each other, the alignment directions of the corresponding alignment layers are different, too. Therefore, the alignment directions of the alignment layers to different regions of the reflective region and the transmissive region are different. As for the manufacturing method for the alignment layer that has different alignment directions, one region can be first irradiated through a mask to form a first alignment direction, then the other region is aligned so that the alignment direction is different from the first alignment direction. However, the alignment layer of the embodiment of the present invention is not limited to such alignment method.

The embodiment of the present invention further provides a display, comprising the above transflective type liquid crystal display panel.

In the display provided by the embodiment of the present invention, during manufacturing the upper substrate, as the second common electrode layer is provided between the first insulating layer and the first substrate of the transmissive region and the reflective region, that is, both the transmissive region and the reflective region is covered with the second common electrode layer, such that the transmissive region and the reflective region in the upper substrate have the same structure, thus, no additional mask plate is needed during manufacturing the second common electrode layer of the upper substrate, thus the difficulty in the manufacturing process is lowered during making the upper substrate, and the difficulty in manufacturing the display is lowed.

The embodiments described above are just exemplary one of the present invention, and are not intended to limit the scope of protection of the invention. The scope of protection of the present invention shall be defined by the appended claims.

The invention claimed is:

1. A transflective type liquid crystal display panel, comprising sequentially from top to bottom: an upper polarizer, a first substrate, a liquid crystal layer, an electrode layer, a second substrate and a lower polarizer, wherein, the upper polarizer has a transmissive axis perpendicular to that of the lower polarizer, each sub-pixel of the liquid crystal display panel is divided into a transmissive region and a reflective region, electrode layers of the transmissive region and the reflective region have different structures, the electrode layer of the transmissive region comprises a plurality of common electrodes and a plurality of pixel electrodes, and the electrode layer in the reflective region comprises a reflective electrode, in the transmissive region and the reflective region, a second common electrode is provided between the liquid crystal layer and the first substrate, in a state where the transflective type liquid crystal display panel is not applied power, liquid crystal molecules in the transmissive region have an initial orientation perpendicular to the first substrate or the second substrate; liquid crystal molecules in the reflective region have an initial orientation which forms an angle of 45 degrees with the transmissive axis of the lower polarizer, and the plurality of common electrodes and the plurality of pixel electrodes in the transmissive region are arranged alternately with an interval therebetween.

2. The transflective type liquid crystal display panel according to claim 1, wherein, each of the common electrodes and each of the pixel electrodes have a same shape which is a continuous sawtooth shape constituted by a plurality of sawtooth edges, and two adjacent sawtooth edges form a sawtooth angle; angle bisectors of the sawtooth angle on each of the common electrodes and the sawtooth angle on each of the pixel electrodes are parallel to or collinear with each other; and the sawtooth angles of the common electrodes and the pixel electrodes with collinear angle bisectors have consistent opening directions.

3. The transflective type liquid crystal display panel according to claim 2, further comprising a first insulating layer located between the first substrate and the liquid crystal layer; and a second insulating layer located between the electrode layers and the second substrate.

4. The transflective type liquid crystal display panel according to claim 2, wherein, in the transmissive region, the plurality of common electrodes and the plurality of pixel electrodes are distributed alternately with equal intervals therebetween.

5. The transflective type liquid crystal display panel according to claim 2, wherein, the second common electrode and the reflective electrode are plane electrodes.

6. The transflective type liquid crystal display panel according to claim 2, further comprising a color filter layer located between the first substrate and the second common electrode.

7. The transflective type liquid crystal display panel according to claim 2, wherein, the sawtooth angle is 90 degrees.

8. The transflective type liquid crystal display panel according to claim 7, further comprising a first insulating layer located between the first substrate and the liquid crystal layer; and a second insulating layer located between the electrode layers and the second substrate.

9. The transflective type liquid crystal display panel according to claim 7, wherein, in the transmissive region, the plurality of common electrodes and the plurality of pixel electrodes are distributed alternately with equal intervals therebetween.

10. The transflective type liquid crystal display panel according to claim 7, wherein, the second common electrode and the reflective electrode are plane electrodes.

11. The transflective type liquid crystal display panel according to claim 1, further comprising a first insulating layer located between the first substrate and the liquid crystal layer; and a second insulating layer located between the electrode layers and the second substrate.

12. The transflective type liquid crystal display panel according to claim 11, wherein, in the transmissive region, the plurality of common electrodes and the plurality of pixel electrodes are distributed alternately with equal intervals therebetween.

13. The transflective type liquid crystal display panel according to claim 11, wherein, the second common electrode and the reflective electrode are plane electrodes.

14. The transflective type liquid crystal display panel according to claim 1, wherein, in the transmissive region, the plurality of common electrodes and the plurality of pixel electrodes are distributed alternately with equal intervals therebetween.

15. The transflective type liquid crystal display panel according to claim 14, wherein, the reflective electrodes are metal electrodes.

16. The transflective type liquid crystal display panel according to claim 14, wherein, the second common electrode and the reflective electrode are plane electrodes.

17. The transflective type liquid crystal display panel according to claim 1, wherein, the second common electrode and the reflective electrode are plane electrodes.

18. The transflective type liquid crystal display panel according to claim 1, further comprising a color filter layer located between the first substrate and the second common electrode.

19. The transflective type liquid crystal display panel according to claim 18, wherein, the color filter layer covers the transmissive region and the reflective region.

20. A display, comprising the transflective type liquid crystal display panel of claim 1.

* * * * *